United States Patent

[11] 3,594,674

[72] Inventor James R. Willson
Garden Grove, Calif.
[21] Appl. No. 849,835
[22] Filed Aug. 13, 1969
[45] Patented July 20, 1971
[73] Assignee Robertshaw Controls Company
Richmond, Va.

[54] TEMPERATURE-RESPONSIVE CONTROL DEVCIES ADJUSTABLY RESPONSIVE TO VARIOUS OPERATING TEMPERATURES
25 Claims, 7 Drawing Figs.

[52] U.S. Cl................................................. 337/139,
337/140, 337/393
[51] Int. Cl..................................................... H01h 37/32,
37/32, H01h 37/46
[50] Field of Search........................................ 337/126,
131, 136, 139, 140, 393

[56] References Cited
UNITED STATES PATENTS
3,403,238 9/1968 Buehler et al.............. 337/140 UX)
3,254,180 5/1966 Flanagan..................... 337/140 (X)
3,127,760 4/1964 Kirkpatrick et al........... 337/140 (UX)
2,354,933 8/1944 Winborne..................... 337/126
1,610,552 12/1926 James........................... 337/139 (X)
FOREIGN PATENTS
1,384,822 11/1964 France........................ 337/140

Primary Examiner—Bernard A. Gilheany
Assistant Examiner—Dewitt M. Morgan
Attorneys—Auzville Jackson, Jr., Robert L. Marben and Anthony A. O'Brien ABSTRACT: Temperature-responsive control device including a control member constructed of a material having a temperature-actuated shape memory and means for adjustably changing the operating temperature of the control device. The operating temperature may be adjusted by varying the stress on the control member with deadweights or springs, by maintaining a constant high rate spring load on the control member while adjusting the operating point of the control member, or by maintaining a constant operating point and a constant load on the control member while varying the rate of the load as it is applied to the control member.

FIG. 1 DEAD WEIGHT LOADED CONTROL MEMBER
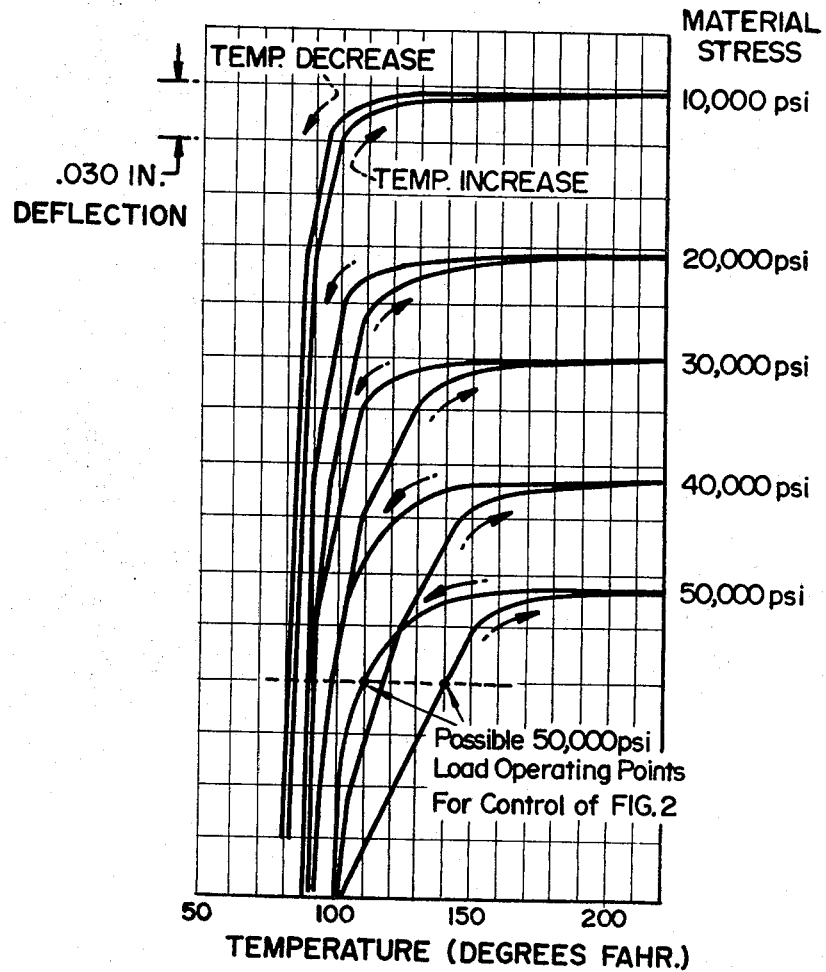
FIG. 2
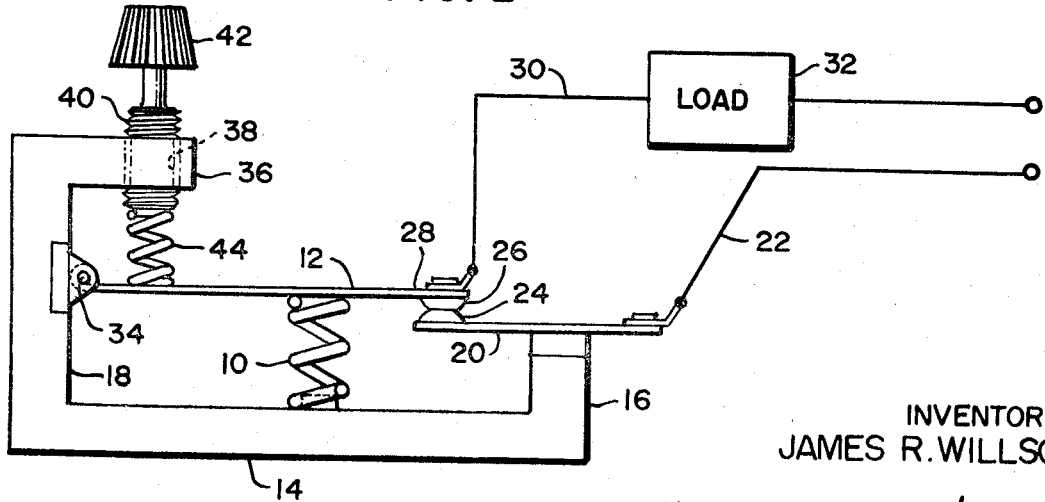
INVENTOR
JAMES R. WILLSON
BY Anthony A. O'Brien
ATTORNEY

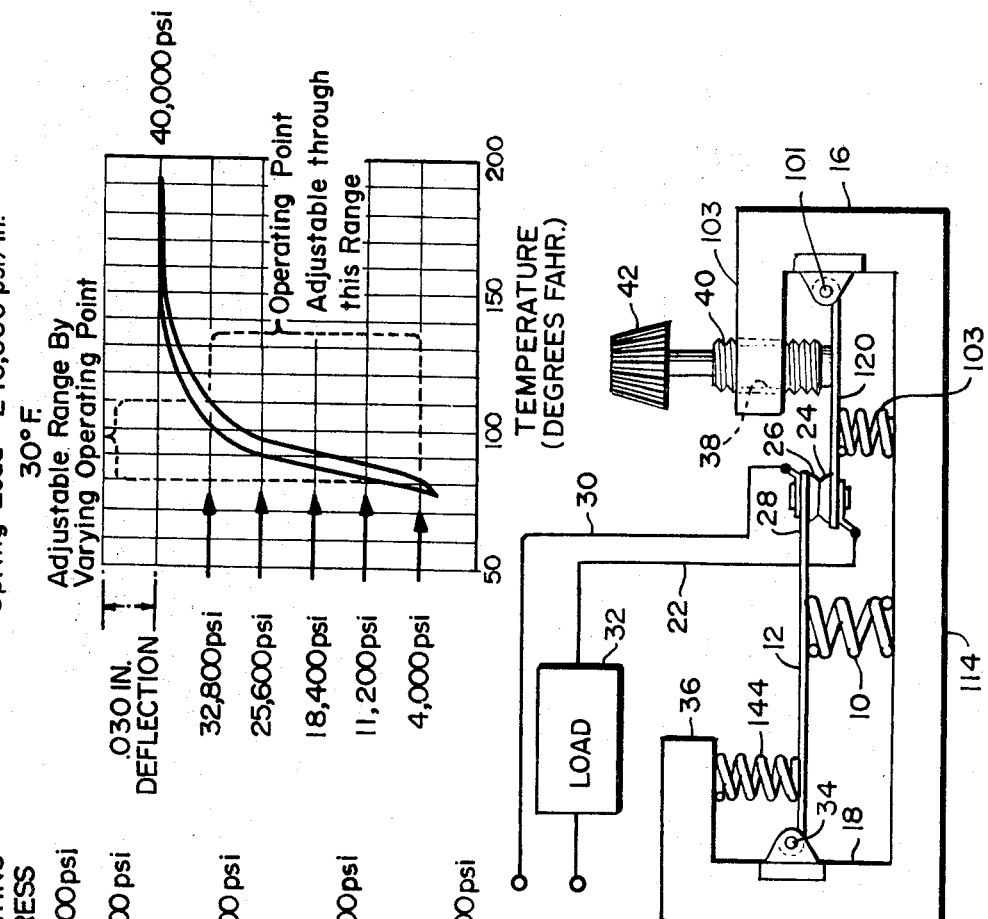
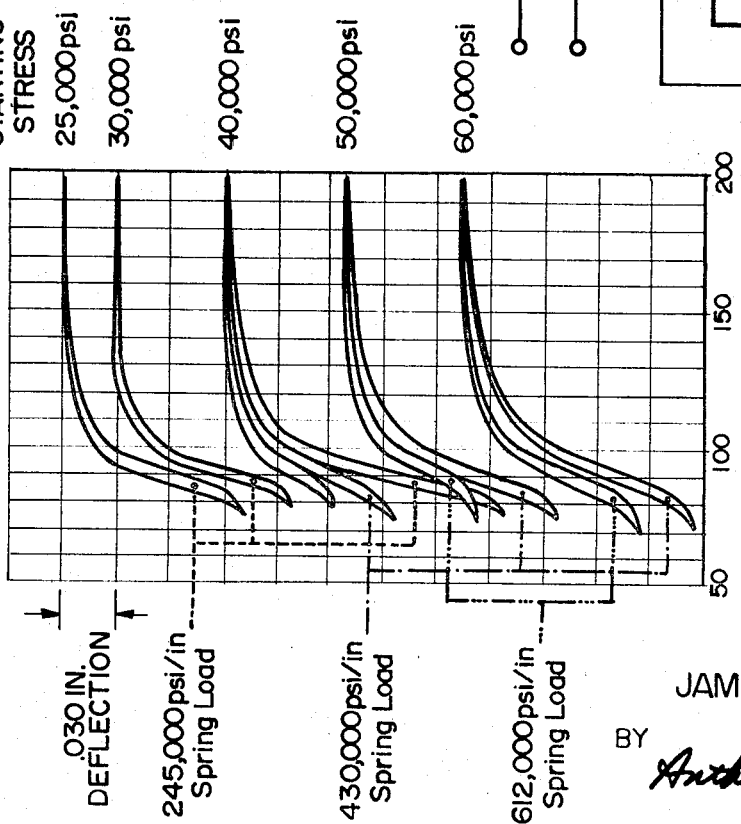
FIG. 5 — OPERATION OF CONTROL DEVICE OF FIG. 4
FIG. 3 — SPRING LOADED CONTROL MEMBER
FIG. 4
INVENTOR
JAMES R. WILLSON
BY Anthony A. O'Brien
ATTORNEY

OPERATION OF CONTROL DEVICE OF FIG. 7

INVENTOR
JAMES R. WILLSON

BY Anthony A. O'Brien

ATTORNEY

3,594,674

TEMPERATURE-RESPONSIVE CONTROL DEVCIES ADJUSTABLY RESPONSIVE TO VARIOUS OPERATING TEMPERATURES

BACKGROUND OF THE INVENTION

The present invention pertains to temperature-responsive control devices adjustably responsive to various operating temperatures and more particularly to such devices utilizing a control member constructed of a material having a temperature-actuated shape memory.

Recently, materials having a temperature-actuated shape memory have been utilized in the construction of control devices such as switches and valves. By "temperature-actuated shape memory" is meant that a straight wire of such a material can be bent or contorted below its "martensitic" transition temperature and it will retain its deformed or distorted shape, but when the deformed wire is heated above its transition temperature with nothing constraining its movement such wire will spring back to its initial straight shape. The transition temperature is represented by a rapid change in modulus on a modulus of elasticity vs. temperature curve. That is, as temperature decreases through the transition zone, the modulus of elasticity decreases. As temperature increases through the transition zone the modulus of elasticity increases.

For most applications of control devices utilizing control members constructed of a material having a temperature-actuated shape memory, it is important to precisely set the operating temperature for the device. That is, it is important that control devices utilized in systems having strict operational requirements be precisely operated, and the operation of the control devices is dependent on operating temperatures. For example, the closing or opening of a valve in a process or environmental system must normally be precisely accomplished with respect to time; and, similarly, the operation of the contacts of a switch in an electrical system requires timing precision. Furthermore, for control devices which are responsive to the temperature of a medium to which they are exposed, such as thermostats, it may easily be seen that precise adjustment of the operating temperature is required.

SUMMARY OF THE INVENTION

Accordingly, it is an object of the present invention to construct a temperature-responsive control device utilizing a control member constructed of a material having a temperature-actuated shape memory such that the operating temperature of the control device may be adjusted.

Another object of the present invention is to utilize adjustable biasing means to control the stress on a control member constructed of a material having a temperature-actuated shape memory in order to control the operating temperature of a control device.

A further object of the present invention is to utilize adjustable biasing means with a temperature-responsive device to control the operating temperature thereof.

The present invention has another object in that high rate load springs are utilized to bias a control member while the operating point of the control member is adjusted to control the operating temperature of a control device.

Another object of the present invention is to utilize a constant load spring with a control member having a constant operating point while varying the rate of the load spring as it is applied to the control member to control the operating temperature of a control device.

One of the advantages of the present invention over the prior art is that temperature-responsive control devices may be accurately and precisely actuated within discrete time- and temperature-oriented parameters.

The present invention is generally characterized in a temperature-responsive control device having movable means adapted to provide a control function, a control member connected with the movable means to control the movement thereof, the control member being constructed of a material having a temperature-actuated shape memory, biasing means applying a force to the control member and adjusting means connected with the biasing means to control the force applied to the control member whereby the operating temperature of the control device may be adjusted.

Further objects and advantages of the present invention will become apparent from the description of the preferred embodiments as shown in the accompanying drawings.

BRIEF DESCRIPTION OF THE DRAWINGS

FIG. 1 is a chart showing a temperature vs. deflection curve for a deadweight-loaded control member.

FIG. 2 is a side elevation of a first embodiment of the present invention.

FIG. 3 is a chart showing a temperature vs. deflection curve for a spring-loaded control member.

FIG. 4 is a side elevation of a second embodiment of the present invention.

FIG. 5 is a chart of a curve for use in explaining the operation of the embodiment of FIG. 4.

DESCRIPTION OF THE PREFERRED EMBODIMENTS

Figure 6:
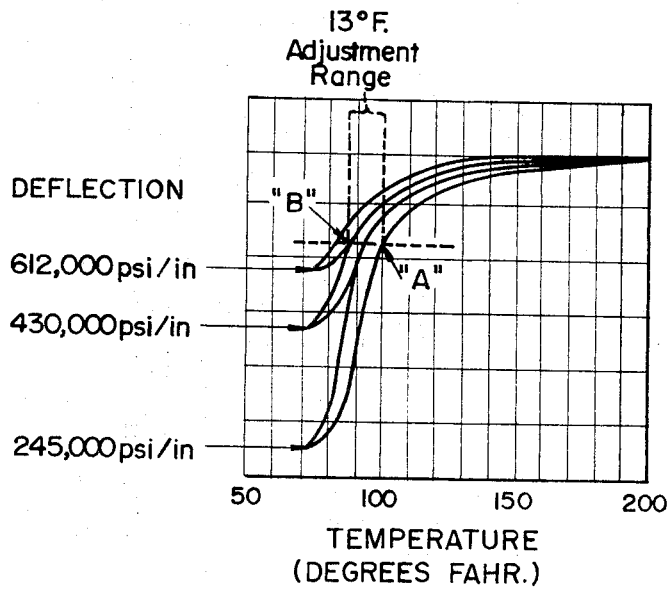
FIG. 6 is a chart showing a temperature vs. deflection curve for a variable rate spring-loaded control member.

All of the embodiments of the present invention utilize control members constructed from a material having a temperature-actuated shape memory. One of the advantages of utilizing such a material is that the material may be utilized to for control members having greatly varying shapes and cross sections, such as rods, flat bars, torsion bars, cantilevers, helical springs, flat springs, wave washers, spring washers, belleville springs, hair springs, clock springs, compression springs, extension springs, or wire forms, to name a few. It is clear that while the control members are illustrated as helical springs, control members may be utilized with the present invention that have any desired shape and cross section.

For more specific information with respect to materials having a temperature-actuated shape memory, reference is made to U.S. Pat. No. 3,174,851 to Buehler et al. and U.S. Pat. No. 3,403,238 to Buehler et al. The above-cited patents are concerned with alloys formed of nickel and titanium; however, while an alloy having a composition of 55 percent nickel by weight with the remainder being essentially titanium may be used with the present invention, the present invention is not limited to these alloys but may utilize any materials having similar properties. That is, any material having a temperature-actuated shape memory or a modulus of elasticity that varies with temperature may be used with the present invention.

For purposes of clarity in the description of the preferred embodiments the shape assumed by a loaded control member at a temperature above the transition temperature will be referred to as the initial shape and the shape assumed by the loaded control member at a temperature below the transition temperature will be referred to as the distorted shape.

FIG. 1 is a chart showing characteristic temperature vs. deflection curves for a control member constructed from a material having a temperature-actuated shape memory. In order to obtain the curves of FIG. 1 the control member was formed as a cantilever beam loaded with deadweights to provide the stresses indicated on the chart. Temperature in degrees Fahrenheit is plotted along the abscissa, and the deflection of the control member is plotted along the ordinate. It can be seen from FIG. 1 that a control member having a fixed load is essentially a fixed temperature material. For example, with a stress of 10,000 p.s.i., the control member is capable of accomplishing approximately 80 percent of its work capability within a 10° F. range. This 10° F. range may be defined as the operating temperature range, and when the temperature is raised or lowered well beyond the operating temperature range, appreciably more movement or work will not be obtained.

As may be seen from the other curves in the chart of FIG. 1, this relationship holds true at higher stresses also. For example, with a 50,000 p.s.i. stress the control member will accomplish most of its movement in a wider but still relatively narrow operating temperature range. Thus, as may be appreciated from a study of the chart of FIG. 1, the operating temperature range of a control member may be controlled by adjusting the stress or force on the control member.

In FIG. 2 an embodiment of a control device in accordance with the present invention is illustrated utilizing a control member 10 constructed of a material having a temperature-actuated shape memory. Control member 10 is illustrated as a helical spring which has an extended or loosely coiled initial shape and a compressed or tightly coiled distorted shape. Control member 10 is mounted in compression between a movable contact arm 12 and the base of a frame 14 which has upstanding legs 16 and 18. Leg 16 supports a stationary contact arm 20 which is connected at one end to a suitable source of electricity, not shown, through a lead 22. The other end of contact arm 20 carries a contact 24 which is adapted to connect with a contact 26 carried on the underside of an end 28 of movable contact arm 12. The upper side of end 28 of movable contact arm 12 is connected with the electrical source through a lead 30 and a load 32. The other end of contact arm 12 is connected with a pivot pin 34 that is secured to leg 18 of frame 14 in a horizontal position. The upper end of leg 18 terminates in a lateral projection 36 that is disposed over movable contact arm 12 in parallel relation therewith. A threaded aperture 38 extends through projection 36 and receives a screw 40 rotatable by an adjustment knob 42. A bias or load spring 44 is mounted in compression between the bottom of screw 40 and the upper side of movable contact arm 12. Spring 44 has a low rate such that it acts as a deadweight bias on movable contact arm 12.

Control member 10 is annealed in its extended or loosely coiled initial shape at a temperature above the transition temperature of the material, and the control member is then subjected to a force such as that from bias spring 44 at a temperature below the transition temperature such that the control member is placed in its compressed or tightly coiled distorted shape. The control device is illustrated in FIG. 2 with its contacts in their normally closed state and control member 10 in its distorted shape due to the force from bias spring 44.

For purposes of clarification, temperature with respect to operation of the control device is now referred to as the operating temperature whereas temperature with respect to the "martensitic" transformation of the material is referred to as the transition temperature.

In operation the control device is actuated in response to the temperature sensed by control member 10 which temperature may be that of a medium under control or may be supplied by passing an electrical current through control member 10 or disposing a heating element in heating proximity to control member 10. In any case upon the sensing of a temperature above the operating temperature by control member 10, the modulus of elasticity of control member 10 will increase such that the bias force from spring 44 is insufficient to maintain control member 10 in its distorted shape and control member 10 will revert to its initial shape thereby pivoting contact arm 12 about pin 34 away from contact arm 20 to open contacts 24 and 26 and interrupt the circuit for load 32.

As previously mentioned, the temperature at which control member 10 will revert to its initial shape is controlled by the stress on control member 10. Thus, for example, with respect to the chart of FIG. 1, if the stress on control member 10 was 10,000 p.s.i., the temperature range within which control member 10 would revert to its initial shape would be between 80° F. and 90° F.

The control device will remain in its actuated state with contacts 24 and 26 open as long as the temperature sensed by control member 10 remains above the operating temperature range. Once the temperature sensed by control member 10 is decreased below the operating temperature range, the decrease in the modulus of elasticity of control member 10 will permit the force from bias spring 44 to overcome control member 10 to cause it to change to its distorted shape thereby moving contact arm 12 down to close contacts 24 and 26 and energize load 32.

By rotation of adjustment knob 42 the operating temperature range may be adjusted. That is, by rotating knob 42 to increase the compression of bias spring 44, the stress on control member 10 is increased to accordingly increase the operating temperature as seen from FIG. 1. Similarly, rotation of knob 42 such as to decrease the compression of bias spring 44 will decrease the stress on control member 10 to lower the operating temperature. For instance, with proper adjustment of knob 42, a stress of 10,000 p.s.i. may be placed on control member 10 to provide an operating temperature range between 80° F. and 90° F., or a stress of 50,000 p.s.i. may be placed on control member 10 to provide an operating temperature range between 100° F. and 150° F. Thus, it may be seen that the control device of FIG. 2 may be selectively adjusted to respond within a desired operating temperature range.

Both positive and negative rate bias springs may be used with the embodiment of FIG. 2; and, of course, deadweights could be used to apply stress to control member 10 by supporting them on movable contact arm 12.

The operating temperature adjustment provided by the control device of FIG. 2 is acceptable where the operating parameters of the control device are very stable and where the temperature settings of the control device are not critical to change. However, with reference to FIG. 1 it can be seen that as the stress increases, the difference between the curves for increasing temperature and decreasing temperature is increased. This difference of hysteresis can be clearly seen by comparing the 50,000 p.s.i. and 10,000 p.s.i. curves. That is, for the 50,000 p.s.i. curve the operating points for increasing and decreasing temperature are 140° F. and 110° F., respectively, while the 10,000 p.s.i. curve the operating points for increasing and decreasing temperatures are both approximately 82° F. If the control device is being operated in an environment such that the condition of the control member under higher stress levels prior to operation is always constant, the temperature change due to hysteresis does not present a problem.

FIG. 3 is a chart showing characteristic temperature vs. deflection curves for a control member in the form of a cantilever beam of a material having a temperature-actuated shape memory, which beam was spring loaded to provide stress on the control member. The load spring had a relatively high rate such that the spring load forces on the control member decreased to zero within the deflection range of the control member. Temperature in degrees Fahrenheit is plotted along the abscissa, and the deflection of the control member is plotted along the ordinate. The stress on the control member in its initial shape is indicated as starting stress, and the families of curves for various rates of spring loading are indicated by dashed lines. It may be seen from FIG. 3 that there is very little hysteresis when the control member is spring loaded as above mentioned; and, consequently, high rate spring-loaded control members permit the obtention of more precise and stable operating temperature adjustment.

In FIG. 4 an embodiment of a control device utilizing a high rate load spring is illustrated. Parts in the control device of FIG. 4 which are identical to parts of the control device of FIG. 2 are given identical reference numerals and similar parts are given reference numerals with 100 added.

The control device of FIG. 4 utilizes a control member 10 constructed of a material having a temperature-actuated shape memory. Control member 10 is illustrated as a helical spring which has an extended or loosely coiled initial shape and a compressed or tightly coiled distorted shape. Control member 10 is mounted in compression between a movable contact art 12 and the base of a frame 114 which has upstanding legs 16 and 18. Leg 16 supports a horizontally disposed pivot pin 101 about which a positionable contact arm 120 pivots. The free end of positionable contact arm 120 carries a contact 24, and a load spring 103 is mounted in compression between the underside of contact arm 120 and the base of frame 114. A lateral projection 103 extends from leg 16 in parallel with and over contact arm 120, and has a threaded aperture 38 therein for receiving a screw 40 rotatable by an adjustment knob 42. A high rate bias or load spring 144 is mounted in compression between a lateral projection 36 extending from the top of leg 18 and the upper side of movable contact arm 12 which carries a contact 26 on the underside of an end 28 thereof. The other end of movable contact arm 12 is connected with a pivot pin 34 horizontally supported by leg 18. A load 32 is adapted to be connected to an electrical source, not shown, through leads 22 and 30 connected with contacts 24 and 26, respectively.

The primary difference between the control devices of FIGS. 2 and 4 is that while the control device of FIG. 2 has the operating temperature adjusted by directly varying the load spring, the control device of FIG. 4 has the operating temperature adjusted by varying the operating point which varies the force from the load spring due to its high rate. Accordingly, contact arm 120 is positionable by movement of knob 42 and screw 40. Load spring 103 is provided so that positionable contact arm 120 will follow movement of screw 40.

The adjustment of the operating temperature for the control device of FIG. 4 may be more easily understood from a study of FIG. 5 which is a more precise illustration of the temperature vs. deflection curve for control member 10 when bias spring 144 has a rate of 240,000 p.s.i. per inch. It may be seen that the precise operating point may be located between the 4,000 p.s.i. and 32,800 p.s.i. force lines for control member 10; and thus, that the operating temperature adjustment range is approximately 30° F.; that is, between 80° F. and 110° F. Accordingly, by movement of positionable contact arm 120, the position at which contacts 24 and 26 break may be adjusted. This adjustment increases or decreases the bias force from spring 144 on control member 10 and, therefore, defines the operating temperature from the curve of FIG. 5.

The operation of the control device of FIG. 4 in controlling the supply of electricity to load 32 is the same as described with respect to the control device of FIG. 2. That is, once the temperature sensed by control member 10 exceeds the operating temperature, as adjusted by knob 42, control member 10 will revert to its initial shape pushing up movable contact arm 12 and opening contacts 24 and 26. Contacts 24 and 26 are closed again after the temperature drops below the adjusted operating temperature.

As is readily apparent, the adjustment of the operating temperature by positioning the contact arms while using a high rate bias spring permits extremely precise definition of the operating point and the operating temperature. Furthermore, the hysteresis error is reduced to a minimum thereby permitting accurate operation with control members under variable stresses over a large range.

Figure 7:
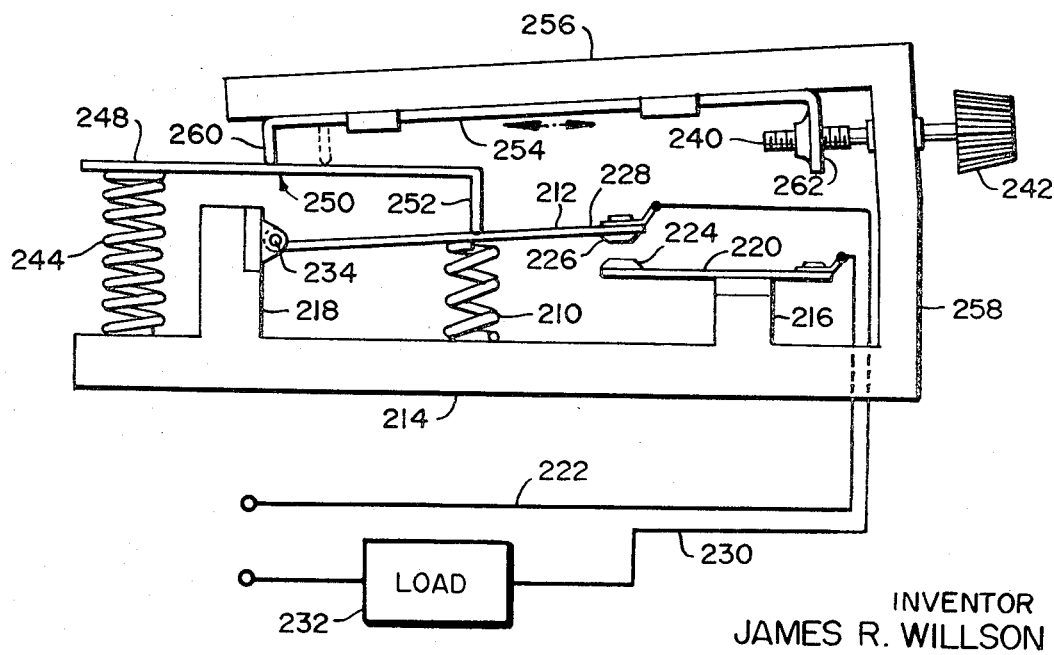
FIG. 7 is a side elevation of a third embodiment of the present invention.

FIG. 6 is a chart for use in understanding another embodiment of the present invention shown in FIG. 7. The curves of FIG. 6 were derived from the use of a control member such as helical spring 210 illustrated in FIG. 7. To compile the curves of FIG. 6, the rate of the bias or load spring was effectively varied while maintaining a constant operating point and load on the control member.

The control device of FIG. 7 includes control member 210 mounted in compression between a movable contact arm 212 and the base of a frame 214. Control member 210 is constructed of a material having a temperature-actuated shape memory and has an extended or loosely coiled initial shape and a compressed or tightly coiled distorted shape. Frame 214 has upstanding legs 216 and 218, and a stationary contact arm 220 is secured to the end of leg 216. Contact arm 220 is adapted to be connected with a suitable source of electricity through a lead 222 at one end and at the other end carries a contact 224 on its upper surface. A contact 226 is secured to the underside of movable contact arm 212 at an end 228, and movable contact arm 212 is adapted to be connected with the source of electricity through a lead 230 and a load 232. The other end of movable contact arm 228 is connected with a pivot pin 234 horizontally disposed on upstanding leg 218.

A high rate load or bias spring 244 is mounted in compression between the base of frame 214 at a position on the other side of leg 218 from control member 210 and the end of the long leg 248 of an L-shaped lever 250. The short leg 252 of lever 250 abuts movable contact arm 212 directly above control member 210. An inverted U-shaped pivot arm 254 is slidably secured to an angled projection 256 extending from an upstanding leg 258 extending from the base of frame 214. A first leg 260 of pivot arm 254 has its end in abutment with lever 250 to act as a fulcrum therefor; and, a second leg 262 has a threaded aperture therethrough for receiving a screw 240 under the control of an adjustment knob 242. The angle of projection 256 from the horizontal and the angle of movable contact arm 212 from the horizontal, when the contacts are open, are equal such that pivot arm 254 is parallel with movable contact arm 212 when control member 10 has its fully extended initial shape as illustrated in FIG. 7. This parallel positioning of pivot arm 254 and contact arm 212 prevents movement of pivot arm 254 from affecting the load applied to control member 210.

As can be seen from the curves of FIG. 6, with the constant operating point shown by the dashed line the operating temperature can be adjusted within a 13° F. range by effectively changing the rate of bias spring 244. Thus, by movement of the fulcrum constituted by leg 260 of pivot arm 254, the rate of bias spring 244 as applied to control member 210 through lever 250 may be varied; and, accordingly, the operating temperature may be adjusted.

Movement of adjustment knob 242 turns screw 240 to move pivot arm 254 and move fulcrum 260 to thereby provide operating temperature adjustment. As an example of operating temperature adjustment, assume that the operating point is constant, as shown by the dashed line in FIG. 6, and that with the fulcrum in the position shown in FIG. 7 the effective rate of bias spring 244 as applied to control member 210 is 245,000 p.s.i. per inch. Thus, the operating temperature is approximately 100° F. as indicated at "A" on FIG. 6. Now, if fulcrum 260 is adjusted by movement of knob 242 to the position shown in phantom in FIG. 7, the effective rate of bias spring 244 will be increased to 612,000 p.s.i. per inch due to the lever action. Thus, the operating temperature will be adjusted to approximately 87° F. as indicated at "B" of FIG. 6.

The operation of the control device of FIG. 7 in controlling the supply of electricity to load 232 is the same as described with respect to the control device of FIG. 2. That is, once the temperature sensed by control member 210 exceeds the operating temperature as adjusted by knob 242, control member 210 will revert to its initial shape as illustrated in FIG. 7 forcing movable contact arm 212 away from contact arm 220 to open contacts 224 and 226. Contacts 224 and 226 are closed again after the temperature drops below the adjusted operating temperature.

It should be clear that the control devices of FIGS. 2, 4 and 7 may, with slight modification, operate normally open contacts by merely transposing forces on the movable contact arms or transposing the positions of the contact arms. Furthermore, the movable contact arms may be seen to be effectively movable members adapted to provide any desired control function. That is, the movable members or contact arms may be utilized to control the operation of a valve or other control device, as well as the switches illustrated.

From the above it may be seen that the various embodiment of the present invention provide essentially three general manners in which to adjust the operating temperature of a control device utilizing a control member having a temperature-actuated shape memory by adjusting the bias on the control member. The embodiment of FIG. 2 utilizes direct adjustment of deadweight bias to change the stress on the control member and vary the operating temperature. The embodiment of FIG. 4 utilizes a constant high rate bias spring while adjusting the operating point to vary the operating temperature of the control device. In the embodiment of FIG. 7 the control device has a constant operating point and a constant load on the control member; however, the rate of the bias spring as it is applied to the control member is adjusted to vary operating temperatures.

In as much as the present invention is subject to many variations, modifications and changes in detail, it is intended that all matter described in the foregoing specification or shown in the accompanying drawings shall be interpreted as illustrative and not in a limiting sense.

What I claim is:

1. A temperature-responsive control device having a first state and a second state comprising
    movable means having a first position corresponding to said first state and a second position corresponding to said second state for providing a control function;
    a control member constructed of a material having a temperature-actuated shape memory connected with said movable means to control the movement thereof, said control member having an initial shape above a transition temperature and being deformable to a distorted shape below said transition temperature;
    said movable means being in said first position when said control member has said initial shape and in said second position when said control member has said distorted shape;
    bias means connected with said control member and acting thereon to deform said control member to said distorted shape; and
    adjusting means connected with said bias means to control the force applied by said bias means to said control member whereby the operating temperature of said control device may be adjusted.

2. The invention as recited in claim 1 wherein said control member is a coiled spring.

3. The invention as recited in claim 2 wherein said coiled spring has a loosely coiled initial shape and a tightly coiled distorted shape.

4. The invention as recited in claim 1 wherein said bias means includes a load spring applying a force in a first direction to said movable means, and said control member applies a force to said movable means in a second direction opposite to said first direction.

5. The invention as recited in claim 4 wherein said adjusting means includes means abutting said load spring whereby movement of said abutting means controls the force applied to said control member.

6. The invention as recited in claim 4 wherein said adjusting means includes positioning means abutting said movable means to control the initial position of said movable means, and said load spring is mounted on said movable means whereby the initial force applied to said control member is controlled by the initial positioning of said movable means.

7. The invention as recited in claim 4 wherein said adjusting means includes lever means having a fulcrum, said lever means connecting said load spring and said movable means, and wherein said adjusting means further includes means for movably positioning the fulcrum to vary the rate of said load spring whereby the force applied to said control member is controlled.

8. The invention as recited in claim 1 wherein said material is an alloy having a composition of 55 percent nickel by weight with the remainder being essentially titanium.

9. A temperature responsive control device comprising
    a frame,
    movable means pivotally mounted on said frame,
    a control member mounted on said frame to apply a force to said movable means and control the movement thereof, said control member having an initial shape and a distorted shape and being constructed of a material having a temperature-actuated shape memory,
    bias means mounted in compression between said frame and said movable means, the force on said movable means from said bias means being opposite to the force on said movable means from said control member, and
    adjusting means abutting said bias spring to control the compression of said bias means and thereby the force from said bias means applied to said control member through said movable means whereby the temperature at which said control device is operated may be adjusted.

10. The invention as recited in claim 9 wherein said bias means includes a load spring and said adjusting means includes a screw threadedly supported by said frame and having an end abutting said load spring.

11. The invention as recited in claim 9 wherein said control member is a helical spring mounted between said frame and said movable means.

12. The invention as recited in claim 11 wherein said helical spring is mounted in compression and has a loosely coiled initial shape and a tightly coiled distorted shape.

13. The invention as recited in claim 12 wherein said control device is an electrical switch, a first stationary contact is secured to said frame, and said movable means carries a second contact, said second contact being in contact with said first contact when said helical spring has said tightly coiled distorted shape and said second contact being removed from said first contact when said helical spring has said loosely coiled initial shape.

14. A temperature-responsive control device comprising
    a frame,
    movable means pivotally supported on said frame,
    a control member mounted on said frame to apply a force to said movable means and control the movement thereof, said control member having an initial shape and a distorted shape and being constructed of a material having a temperature-actuated shape memory,
    a high rate bias spring mounted between said frame and said movable means to apply a force to said movable means opposite to the force from said control member, and
    adjustable positioning means supported by said frame and abutting said movable means to control the initial position of said movable means and the force applied to said control member through said movable member by said bias spring whereby the operating temperature of said control device may be adjusted.

15. The invention as recited in claim 14 wherein said adjustable positioning means includes an arm pivotally supported on said frame and abutting said movable means, a screw threadedly supported by said frame and having an end abutting said arm and means for forcing said arm against the end of said screw.

16. The invention as recited in claim 14 wherein said control member is a helical spring mounted between said frame and said movable means.

17. The invention as recited in claim 15 wherein said helical spring is mounted in compression and has a loosely coiled initial shape and a tightly coiled distorted shape.

18. The invention as recited in claim 17 wherein said control device is an electrical switch, said adjustable positioning means includes an arm supported by said frame and carrying a first contact and said movable means carries a second contact, said second contact being in contact with said first contact when said helical spring has said tightly coiled distorted shape and said second contact being removed from said first contact when said helical spring has said loosely coiled initial shape.

19. A temperature-responsive control device comprising
    a frame,
    movable means pivotally mounted on said frame,
    a control member mounted on said frame to apply a force to said movable means and control the movement thereof, said control member having an initial shape and a distorted shape and being constructed of a material having a temperature-actuated shape memory,
    bias means mounted on said frame, adjusting means connected with said bias means and said movable means to apply a force on said movable means opposite to the force on said movable means from said control means, said adjusting means being adjustable to vary the rate of said bias means as applied through said movable means to said control member whereby the operating temperature of said control device may be adjusted.

20. The invention as recited in claim 19 wherein said adjusting means includes lever means having a first end abutting said bias means and a second end abutting said movable means, a pivot arm slidably supported by said frame and abutting said lever means to provide a fulcrum point and means for moving said pivot arm to move said fulcrum point.

21. The invention as recited in claim 20 wherein said means for moving said pivot arm includes a screw threadedly engaged with said pivot arm, and said lever means is generally L-shaped having a first leg corresponding to said first end and a second leg corresponding to said second end and angularly disposed from said first leg, said second leg of said lever means abutting said movable means directly above said control member.

22. The invention as recited in claim 20 wherein said frame includes a projection slidably supporting said pivot arm such that said pivot arm is disposed in parallel with said movable means.

23. The invention as recited in claim 19 wherein said control member is a helical spring mounted between said frame and said movable means.

24. The invention as recited in claim 23 wherein said helical spring is mounted in compression and has a loosely coiled initial shape and a tightly coiled distorted shape.

25. The invention as recited in claim 24 wherein said control device is an electrical switch, a first stationary contact is secured to said frame, and said movable means carries a second contact, said second contact being in contact with said first contact when said helical spring has said tightly coiled distorted shape and said second contact being removed from said first contact when said helical spring has said loosely coiled initial shape.